United States Patent Office 3,560,489
Patented Feb. 2, 1971

---

3,560,489
7-α-AMINOACYL CEPHALOSPORINS
Robert B. Morin, Indianapolis, Ind., assignor to Eli Lilly and Company, Indianapolis, Ind., a corporation of Indiana
No Drawing. Continuation-in-part of applications Ser. No. 137,000, Sept. 11, 1961, and Ser. No. 438,038, Mar. 8, 1965. This application Aug. 12, 1966, Ser. No. 571,966
Int. Cl. C07d 99/24
U.S. Cl. 260—243                                                   15 Claims

ABSTRACT OF THE DISCLOSURE

Certain substituted 7-α-aminoacyl cephalosporins, prepared by the acylation of 7-aminocephalosporanic acid, having high antibiotic activity.

---

This is a continuation-in-part of application Ser. No. 438,038, filed Mar. 8, 1965, and of application Ser. No. 137,000, filed Sept. 11, 1961, both now abandoned.

This invention relates to novel organic compounds and to methods for their preparation.

The novel compounds of this invention are represented by the following structural formula:

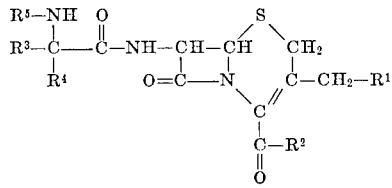

wherein:

$R^1$ is acetoxy, hydroxy, or pyridino;
$R^2$ is —OH when $R^1$ is hydroxy or acetoxy;
$R^2$ is —O⁻ when $R^1$ is pyridino;
$R^3$ is phenyl, naphthyl, thienyl, benzothienyl, furyl, benzofuryl, indolyl, or pyridyl;
$R^4$ is hydrogen or methyl; and
$R^5$ is hydrogen or methyl.

Thus, $R^3$ can be phenyl, α-naphthyl, β-naphthyl, 2-thienyl, 3-thienyl, 2-benzothienyl, 3-benzothienyl, 2-furyl, 3-furyl, 2-benzofuryl, 3-benzofuryl, α-indolyl, β-indolyl, 2-pyridyl, 3-pyridyl, 4-pyridyl, and the like.

Also included within the scope of the invention are salts of the above compounds with pharmaceutically acceptable cations and anions.

For purpose of illustration, there can be mentioned several types of cationic salts which can be prepared from compounds containing the cephalosporin C nucleus, including for example, water-soluble salts such as the sodium, potassium, lithium, ammonium, and substituted ammonium salts, as well as the less water-soluble salts such as the calcium, barium, procaine, quinine, and dibenzylethylenediamine salts. All of these compounds also form anionic salts, i.e., acid addition salts, with strong acids such as hydrochloric, hydrobromic, phosphoric, sulfuric, and like acids.

The novel compounds of the present invention are related to cephalosporin C insofar as they contain the 5,6-dihydro-6H-1,5-thiazine ring with a fused β-lactam ring in the 5,6 position which is characteristic of cephalosporin C. However, unlike cephalosporin C, which contains the 5′-amino-N′-adipamyl group in the 7 position, the compounds of the present invention are characterized by an acylamido group in the 7 position having an amine group in the α position. Moreover, unlike cephalosporin C, which has a relatively low antibacterial action, the compounds of the present invention are highly effective antibacterial agents, capable of inhibiting the growth of numerous types of microorganisms in a variety of environments.

As will be observed from the formulas given above, the invention includes a variety of related compounds having the bicyclic ring structure of cephalosporin C, but with variations in the substituent groups attached thereto. Among such compounds are those having the nuclei of the cephalosporin-type products known as desacetylcephalosporin $C_A$, these nuclei being represented by the following formulas, respectively:

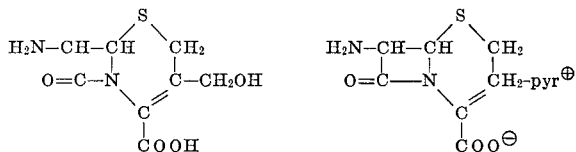

where pyr represents a pyridino radical, exemplified hereinafter.

In naming the novel compounds of the invention, it is convenient to designate the basic saturated fused-ring β-lactam thiazine structure as "cephem,"

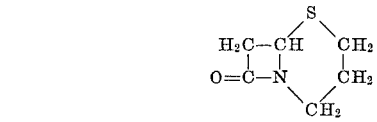

and to name the compounds as derivatives thereof, the term "cephem" referring to the basic structure with a single olefinic bond. According to this system, cephalosporin C would be named 3-acetoxy-methyl-7-(5′-aminoadipamido)-3-cephem-4-carboxylic acid and the compounds of this invention would be named as 3-acetoxymethyl-7-(α-aminoacylamido)-3-cephem-4-carboxylic acids (or more conveniently), 7 - (α - aminoacylamido)cephalosporanic acids), 3 - hydroxy-methyl-7-(α-aminoacylamido)-3-cephem-4-carboxylic acids, and 3-pyridinomethyl-7-(α-aminoacylamido)-3-cephem-4-carboxylic acids.

The following examples, together with the operating examples appearing hereinafter, will illustrate the types of compounds available in accordance with the present invention:

7-[α-amino-α-(α′-napthyl)acetamido]cephalosporanic acid
7-[α-amino-α-(β-naphthyl)propionamido]cephalosporanic acid
7-[α-amino-α-(2′-thienyl)acetamido]cephalosporanic acid
7-[α-amino-α-(3′-benzothienyl)propionamido]cephalosporanic acid
7-[α-amino-α-(2′-furyl)propionamino]cephalosporanic acid
7-[α-amino-α-(3′-benzofuryl)acetamido]cephalosporanic acid
7-[α-amino-α-(2′-indolyl)acetamido]cephalosporanic acid
7-[α-amino-α-(3′-pyridyl)acetamido]cephalosporanic acid
7-[α-methylamino-α-(m-bromophenyl)acetamido]cephalosporanic acid
7-[α-methylamino-α-(p-tolyl)acetamido]cephalosporanic acid
7-[α-methylamino-α-(o-chlorophenyl)propionamido] cephalosporanic acid
7-[α-methylamino-α-(m-methoxyphenyl)acetamido] cephalosporanic acid
7[α-methylamino-α-(p-trifluoromethylphenyl)acetamido]cephalosporanic acid
7-[α-methylamino-α-(m-nitrophenyl)propionamido]- cephalosporanic acid
3-pyridinomethyl-7-(α-methylamino-α-phenylacetamido)-3-cephem-4-carboxylic acid
3-(4′-carbamoylpyridinomethyl)-7-[α-amino-α-(p-chlorophenyl)acetamido]-3-cephem-4-carboxylic acid 3-(2'-hydroxymethylpyridinomethyl)-7-(α-amino-α-phenylpropionamido)-3-cephem-4-carboxylic acid 3-(2',4',6'-trimethylpyridinomethyl)-7-(α-amino-α-phenylpropionamido)-3-cephem-4-carboxylic acid 3-(N-sulfapyridinomethyl)-7-(α-amino-α-phenylacetamido)-3-cephem-4-carboxylic acid 3-pyridinomethyl-7-[α-amino-α-[3-(5-trifluoromethyl)-benzofuryl]propionamido]-3-cephem-4-carboxylic acid 3-(2'-hydroxymethylpyridinomethyl)-7-(α-amino-α-phenylpropionamido)-3-cephem-4-carboxylic acid 3-(3-(3'-carbamoylpyridinomethyl)-7-[α-amino-α-(2-pyridyl)acetamido]-3-cephem-4-carboxylic acid 3-hydroxymethyl-7-[α-amino-α-(1-naphthyl)acetamido]-3-cephem-4-carboxylic acid 3-hydroxymethyl-7-[α-amino-α-(2-thienyl)acetamido]-3-cephen-4-carboxylic acid 3-hydroxymethyl-7-[α-amino-α-(β-naphthyl)propionamido]-3-cephem-4-carboxylic acid 3-hydroxymethyl-7-[α-amino-α-(3-pyridyl)propionamido]-3-cephem-4-carboxylic acid and the like.

Cephalosporin C can be prepared by cultivating a cephalosporin C-producing organism in a suitable nutrient medium, as described in British patent specification 810,196, published Mar. 11, 1959.

Cephalosporin C is readily converted into the corresponding nucleus compound, 7-aminocephalosporanic acid, by cleaving the 5'-amino-N'-adipamyl side chain between its amido carbonyl group and its amido nitrogen, suitably by reacting cephalosporin C with nitrosyl chloride in formic acid, then hydrolytically cleaving, according to the method of Morin et al. described in U.S. Pat. 3,188,311 (June 8, 1965).

The compounds of the present invention are prepared by acylation of the cephalosporin C or cephalosporin $C_A$ nucleus, using any of the appropriate conventional acylation procedures, and utilizing the various types of known acylating agents having a composition which yields the desired side chain.

A convenient acylating agent is the appropriate amino-substituted acyl chloride or bromide in which the amino group has been protected in a conventional manner with a carbobenzoxy, carboallyloxy, tert.-butoxycarbonyl, β-oxoalkylidene, furfuryloxycarbonyl, adamantyloxycarbonyl, or trityl group or the like. The acylation is carried out in water or an appropriate organic solvent, preferably under substantially neutral conditions, and preferably at or somewhat below room temperature, e.g., above the freezing point of the reaction mixture and up to about 20° C. In a typical procedure, 7-aminocephalosporanic acid, together with a sufficient quantity of sodium bicarbonate or other appropriate alkali to promote solution, is dissolved in aqueous 50 volume-percent acetone, the concentration of the 7-aminocephalosporanic acid being about 1 to about 4 percent by weight. The solution is cooled to around 0 to 5° C., and a solution of the protected-amino-acylating agent is added in about 20 percent excess, with stirring and cooling. The pH of the mixture can be maintained, if it tends to vary, around the neutral level by adding sodium bicarbonate thereto or bubbling carbon dioxide therein. After addition of the acylating agent has been completed, stirring of the reaction mixture is continued, and the mixture is allowed to warm to room temperature. The reaction product is then acidified to around pH 2 with hydrochloric acid and extracted with an organic solvent such as ethyl acetate. The ethyl acetate extract is adjusted to around pH 5.5 with a base containing the sodium, potassium, ammonium, or other cation as desired, and is extracted with water. The water solution is separated and evaporated to dryness. The residue is taken up in the minimum quantity of warm methanol and the desired product is precipitated by cooling and/or evaporating, optionally with addition of ethanol as an antisolvent. The crystalline product obtained thereby is filtered, washed with acetone, and dried.

Before or after crystallization, the product or crude product can be treated in a conventional manner to remove the protective group from the amino group, suitably by hydrogenation under mild conditions in the presence of a palladium catalyst, or by exposure to mild acid conditions at elevated temperature for a short time (e.g., dilute acetic acid at 50–100° C. for between 30 and 2 minutes). The desired final product is obtained in this way.

Acylation of the 7-amino group can also be carried out with the appropriate aminocarboxylic acid, employed in conjunction with an equimolar proportion or more of a carbodiimide, and the acylation proceeds at ordinary temperatures in such cases. Any of the carbodiimides are effective for this purpose, the active moiety being the —N=C=N— structure. Illustrative examples include N,N'-diethylcarbodiimide, N,N'-di-n-propylcarbodiimide, N,N'-diisopropylcarbodiimide, N,N'-dicyclohexylcarbodiimide, N,N'-diallylcarbodiimide, N,N'-bis(p-dimethylaminophenyl)carbodiimide, N-ethyl-N'-(4''-ethyl-2-''-oxazinyl)carbodiimide, and the like, other suitable carbodiimides being disclosed by Sheehan in U.S. Pat. No. 2,938,892 (May 31, 1960) and by Hofmann et al. in U.S. Pat. No. 3,065,224 (Nov. 20, 1962).

Alternatively, the acylation of the 7-amino group can be carried out with an activated derivative of the appropriate amino carboxylic acid, suitably the corresponding acid anhydride, or a mixed anhydride of the acid, or an activated ester. Other suitable derivatives can readily be ascertained from the art.

In most cases, the acylating agent contains one or more asymmetric carbon atoms and thus exists in optically active forms. When prepared by ordinary chemical means, such compounds are ordinarily obtained in racemic form—i.e., an equimolar mixture of the optical isomers, having no optical rotation. When the separate optical isomers are desired, the acylating agent can be resolved in a conventional manner such as by reacting the free acid with cinchonine, strychnine, brucine, or the like, then fractionally crystallizing to separate the diastereoisomeric salts, and separately acidifying the solid phase and the liquid phase to liberate the optical isomers. The free acids thus obtained can be employed as such for the acylation, preferably in conjunction with a carbodiimide, or may be converted by conventional means into the corresponding acid halide or into a mixed anhydride, care being exercised to avoid extremes of conditions which might produce racemization.

Many of the acylating agents, together with methods for their preparation, are described in the literature, and a number of them are commercially available. All of them are readily prepared by methods well known in the art.

Cephalosporin C compounds (i.e., those having the 3-acetoxymethyl moiety) are readily converted into compounds of the cephalosporin $C_A$ type by heating at moderately elevated temperature in aqueous solution with an excess of pyridine, for example, as described in Belgian Pat. 593,777. The reaction is applicable in general to pyridines and substituted pyridines of which numerous examples are given below, yielding corresponding derivatives of the cephalosporin $C_A$ type wherein the pyridino moiety is attached to the methyl group in the 5 position of the thiazine ring, and forms an inner salt with the carboxyl group in the 4 position.

The desacetylcephalosporin C derivatives are conveniently prepared from the corresponding 7-acylamidocephalosporin C compound by treating the cephalosporin C compound with citrus acetylesterase for several hours in aqueous phosphate buffer at pH 6.5–7 according to the method of Jansen, Jang, and MacDonnell, Archiv. Biochem., 15, 415–31 (1947).

The invention will be more readily understood from the following operating examples, which are submitted as illustrations only, and not by way of limitation.

EXAMPLE 1 dl-Phenylglycine is resolved in a conventional manner by reaction with cinchonine, fractional crystallization of the resulting diastereoisomers, and acidification to release the phenylglycine enantiomorphs.

D-phenylglycine, thus prepared, is reacted with carbobenzoxy chloride in a conventional manner to produce N-carbobenzoxy-D-phenylglycine.

A 0.60-g. portion of N-carbobenzoxy-D-phenylglycine is dissolved in 10 ml. of dry tetrahydrofuran. The solution is cooled in an ice-salt bath, and to it is added 0.29 ml. of triethylamine with stirring over a period of 10 minutes, followed by 0.29 ml. of isobutyl chloroformate, after which stirring is continued for 10 minutes at −5° C. During this time, 0.57 g. of 7-aminocephalosporanic acid and 0.29 ml. of triethylamine are dissolved in 5 ml. of tetrahydrofuran and 5 ml. of water, and the solution is centrifuged to remove a dark sludge. The clarified solution is cooled in ice and slowly added to the reaction mixture, and stirring is continued in the ice bath for 0.5 hour, followed by one hour at room temperature. The reaction product mixture is a homogeneous solution having a pH of about 6. It is evaporated under vacuum to a semisolid residue. To the residue are added 35 ml. of water and a few drops of triethylamine to raise the pH to 8. The aqueous solution obtained thereby is extracted successively with 50-ml. and 35-ml. portions of ethyl acetate, the pH being adjusted to 2 at each extraction with hydrochloric acid. The extracts are combined, filtered, dried over sodium sulfate, stripped of solvent, and evaporated under vacuum. The product is 7-(N-carbobenzoxy-D-$\alpha$-aminophenylacetamido)cephalosporanic acid in the form of a yellow-white amorphous solid weighing 1.10 g.

Of this material, 1.0 g. is dissolved in 150 ml. of warm 95 percent ethyl alcohol. To the solution is added 1.0 g. of 5 percent palladium on carbon catalyst, and the mixture is hydrogenated at room temperature and atmospheric pressure by bubbling hydrogen into it for three hours with stirring. The hydrogenation product is filtered. The solid phase, comprising the catalyst and the desired product, is suspended in ethyl acetate and water and adjusted to pH 2 with hydrochloric acid. The suspension is filtered to remove the catalyst. The aqueous phase is separated from the filtrate, and is evaporated under vacuum to recover the desired product, 7-(D-$\alpha$-aminophenylacetamido)cephalosporanic acid.

The above-named compound has a high degree of activity against many gram-negative pathogens as shown by the following list of its minimum inhibitory concentration against a series of said pathogens.

| Organism: | Activity, MIC, $\mu$g./ml. |
|---|---|
| Aerobacter aerogenes | 2.1–6 |
| Salmonella enteritidis | 6 |
| Klebsiella pneumoniae | 2.9–6 |
| Escherichia coli | 2.3–6 |
| Shigella sp. | 2.5–6.8 |

EXAMPLE 2

To a solution of 1.48 g. of N,N′-dicyclohexylcarbodiimide in 100 ml. of tetrahydrofuran are added 2.05 g. of dl-N-carbobenzoxy-$\alpha$-aminophenylacetic acid, followed by a solution of 2 g. of 7-aminocephalosporanic acid in 7.2 ml. of aqueous 1 N sodium hydroxide solution, and the mixture is stirred overnight at room temperature. The tetrahydrofuran and water are stripped off under vacuum. The resulting oil is dissolved in water, filtered, and extracted with ethyl acetate at pH 2, employing hydrochloric acid for pH adjustment. The ethyl acetate extract is separated and stripped of solvent under vacuum. The residue is washed with ether, then redissolved in ethyl acetate and back-extracted into water at pH 6.5, employing aqueous potassium hydroxide solution for pH adjustment. The aqueous extract is evaporated to dryness under vacuum. The resulting oil is redissolved in methanol, and is precipitated as an amorphous solid by gradual evaporation of methanol and simultaneous addition of ethanol. The yield is 278 mg. of 7-($\alpha$-carbobenzoxyamino-$\alpha$-phenylacetamido)cephalosporanic acid in the form of the potassium salts of the mixed diasteroisomers.

The material obtained thereby is subjected to selective hydrogenolysis as in Example 1 to remove the carbobenzoxy protective group from the $\alpha$-amino group of the side chain, yielding 200 mg. of 7-(dl-$\alpha$-aminophenylacetamido)cephalosporanic acid as the final product.

EXAMPLE 3

To a mixture of 230 ml. of dioxane and 15 ml. of acetone are added 2.1 ml. of triethylamine, followed by 4.25 g. of dl-(N-carbobenzoxy-$\alpha$-amino)phenylacetic acid. The resulting solution is cooled to 0° C., and to it is added dropwise a solution of 2.04 g. of isobutyl chloroformate in 15 ml. of acetone with stirring over a period of 15 minutes. The completed mixture is allowed to stand for 10 minutes at 0° C. To it is then added a solution of 4.1 g. of 7-aminocephalosporanic acid and 2.1 ml. of triethylamine in 15 ml. of water. The total mixture is allowed to stand two hours at room temperature. It is then diluted with 300 ml. of water and washed twice with ether. The washed solution is acidified to pH 2 with 1 N hydrochloric acid and extracted with 300 ml. of ethyl acetate. The ethyl acetate extract is washed once with water, then back-extracted with 100 ml. of water at pH 6.5, the pH adjustment being effected with 1 N potassium hydroxide. The aqueous extract is separated and evaporated to dryness under vacuum. The crystalline residue obtained thereby is recrystallized from methanol, yielding 2.5 g. of 7-(dl-N-carbobenzoxy-$\alpha$-aminophenylacetamido)cephalosporanic acid in the form of the potassium salt.

The intermediate thus obtained is selectively hydrogenated as in Example 1, and 7-(dl-$\alpha$-aminophenylacetamido)cephalosporanic acid is obtained as the final product.

EXAMPLE 4

D-$\alpha$-phenylglycine, 36 g. (240 millimoles), was slurried in 240 ml. of water containing 63.6 g. (600 millimoles) of sodium carbonate. A solution of p-methoxybenzyl p′-nitrophenyl carbonate, 61.2 g. (300 millimoles), [prepared as described by Weygand and Hunger, Ber. 95, (1962)], in 300 ml. of tert.-butyl alcohol was added, and the mixture was heated on a steam bath for 2 hours with occasional stirring. An additional 240 ml. of water and 360 ml. of tert.-butyl alcohol was added, and the mixture was heated an additional one-half hour to bring about complete solution. The tert.-butyl alcohol was removed under reduced pressure and the sodium p-nitrophenylate thereby precipitated was removed by filtration. The filtrate was acidified to pH 6.6 with 1 N hydrochloric acid and extracted with 100 ml. of ether to deplete the solution further of p-nitrophenol. The aqueous mixture then had a pH of 7.2 and required acidification to pH of 6.5 before a second ether extraction could remove the remaining p-nitrophenol. The mixture was then acidified to pH 2 and the desired product was separated by ethyl acetate extraction. The organic extract was dried and evaporated to dryness. The crystalline residue was purified by recrystallization from hot ethyl acetate-petroleum ether (boiling range 60–90° C.). The yield of purified product, N-(p-methoxybenzyloxycarbonyl)-D-$\alpha$-phenylglycine, was 52 g. (69 percent); melting point, 128–129° C.

Analysis.—Calcd. (percent): C, 64.75; H, 5.43; N, 4.44. Found (percent): C, 64.64; H, 5.61; N. 4.44.

N - (p-methoxybenzyloxycarbonyl)-D-$\alpha$-phenylglycine, 4.2 g. (13.3 millimoles), was dissolved in 80 ml. of dry tetrahydrofuran containing triethylamine, 1.2 g. (14 millimoles), and cooled to 0° C. While stirring, isobutyl chloroformate, 1.82 g. (13.3 millimoles), dissolved in 20 ml. of dry tetrahydrofuran, was added dropwise over a period of 10 minutes. The resulting anhydride was allowed to stir an additional 10 minutes. 7-aminocephalosporanic acid, 3.63 g. (13.3 millimoles), dissolved in 25 ml. of water containing triethylamine, 1.42 g. (14 millimoles), and filtered, was added dropwise to the mixed anhydride over a period of 10 to 15 minutes. The reaction mixture was cooled and stirred for 2 hours, then stirred at room temperature for 8 hours. The organic solvents were removed under reduced pressure, and the aqueous reaction mixture was washed with ether, cooled, over-layered with cold ethyl acetate, and acidified to pH 2.5. The ethyl acetate solution was separated, dried, and evaporated to dryness. The resulting light-yellow solid, 7-[N'-(p-methoxybenzyloxycarbonyl) - D - α - phenylglycylamido] cephalosporanic acid, was recrystallized from a hot solution of ethanol-petroleum ether (boiling range 60–90° C.). Yield, 2.5 g.

*Analysis.*—Calcd. (percent): N, 7.38. Found (percent): N, 7.07.

7-[N'-(p-methoxybenzyloxycarbonyl) - D - α - phenylglycylamido]-cephalosporanic acid, 300 mg., was dissolved in 6 ml. of cold trifluoroacetic acid and stirred at 0° C. for 15 minutes. Anhydrous ether was then added to precipitate 7-(D-α-aminophenylacetamido)-cephalosporanic acid trifluoroacetate.

EXAMPLE 5

Experiment A 7-aminocephalosporanic acid, 5.0 g. (18.4 millimoles), was dissolved in 50 ml. of water containing 2.3 g. sodium bicarbonate. Isonicotinamide, 5 g. (41 millimoles), and sodium thiocyanate, 5 g. (62 millimoles), were added. The mixture was stirred and heated in a water bath at 60° C. for 4 hours, concentrated in vacuo to a smaller volume, and treated successively with 250-ml. and 100-ml. portions of Amberlite LA–1 resin (OAc⁻). (Amberlite LA–1, sold by Rohm & Haas, is a water-insoluble, high molecular weight, liquid, secondary amine anion exchange resin prepared as described in U.S. Pat. 2,870,207.) The clarified aqueous solution was washed with 100 ml. of methyl isobutyl ketone, then concentrated to dryness under reduced pressure. The residue was stirred in nine 250-ml. portions of ethanol to remove sodium acetate. The resulting intermediate product, 3-(4'-carbamylpyridinomethyl)-7-amino - 3 - cephem-4-carboxylic acid, weighed 3.0 g.

N-(p - methoxybenzyloxycarbonyl)-D-α-phenylglycine, 1.2 g. (3.8 millimoles), as prepared by the method of Example 4, was dissolved in dry tetrahydrofuran containing 400 mg. of triethylamine. The solution was cooled in an ice bath, and 520 mg. (3.8 millimoles) of isobutyl chloroformate in 10 ml. of dry tetrahydrofuran were added dropwise with stirring. After 20 minutes, 3-(4'-carbamylpyridinomethyl)-7-amino - 3 - cephem-4-carboxylic acid, 1.3 g. (3.8 millimoles), in 10 ml. of cold water was added dropwise over a period of 30 minutes. The mixture was stirred with cooling for 3 hours. Cold water, 300 ml., was added and the tetrahydrofuran removed in vacuo. The remaining aqueous solution was over-layered with ethyl acetate and acidified to pH 2.5 with 1 N hydrochloric acid. The aqueous layer was evaporated to dryness in vacuo. The amorphous residue was dissolved in methanol, filtered, and concentrated to crystallization. The resulting product, 3-(4'-carbamylpyridinomethyl) - 7 - [α-(4-methoxybenzyloxycarbamido) phenylacetamido]-3-cephem-4-carboxylic acid, 1.0 g., was treated with trifluoroacetic acid, 10 ml., in a manner similar to Example 4, for the removal of the 4-methoxybenzyloxycarbonyl protecting group, yielding 3-(4'-carbamylpyridinomethyl) - 7 - (α-amino-α-phenylacetamido)-3-cephem-4-carboxylic acid.

Experiment B

The procedure of Experiment A was followed except that lithium thiocyanate was used in place of sodium thiocyanate as the quaternizing reagent. The resulting lithium acetate from LA–1 (OAc⁻) crystallization was converted to lithium bromide with 1 N hydrobromic acid and the resulting lithium bromide separated from the product by trituration with dry acetone. The product obtained was identical in all respects to the product obtained in Experiment A.

Experiment C

The method of Experiment A was followed in all respects except that sodium iodide was employed as a quaternizing agent in place of sodium thiocyanate. The sodium hydroxide was removed by trituration with dry acetone as in Experiment B. The product was identical in all respects to that obtained in Experiment A.

EXAMPLE 6

A solution containing 20 g. of phosgene in 100 ml. of anhydrous benzene was maintained at about 20° C. by means of an ice-water bath. A mixture containing 8 g. of 1-hydroxyadamantane, 6 g. of pyridine, and 200 ml. of ether was added dropwise with stirring to the phosgene solution over a period of about 1 hour while still maintaining the solution temperature at about 20° C. During the addition, a white precipitate was formed, and an additional 100 ml. of anhydrous benzene were added to give a better dispersion of the solids in the reaction mixture. After the addition had been completed, the reaction mixture was maintained at ambient temperature for about 1 hour and was then filtered. The filtrate was poured over a mixture of ice and water, and this mixture was then placed in a separatory funnel and shaken. The organic layer was separated and dried, and its volume reduced by about 80 percent by evaporation in vacuo. An aliquot of the resulting concentrate was evaporated in vacuo to dryness at room temperature, yielding 1-adamantyl chloroformate as a white crystalline solid melting at about 40–42° C. Recrystallization was achieved from anhydrous petroleum ether (boiling point, 30–60° C.) at −20° C., yielding crystals melting at about 46–47° C. Infrared spectrum of the product confirmed the expected structure.

*Analysis.*—Calcd. (percent): C, 61.54; H, 7.04; Cl, 16.52. Found (percent): C, 61.48; H, 7.06; Cl, 16.93.

D-α-phenylglycine, 2.27 g. (15 millimoles), was dissolved in a mixture of 30 ml. of water, 16 ml. of 1 N sodium hydroxide, and 15 ml. of ether. While cooling and stirring, adamantyl chloroformate, 4.55 g. (22 millimoles), in 40 ml. of cold, dry dioxane was added dropwise. Simultaneously, 15 ml. of cold 1 N sodium hydroxide were added to the solution. The reaction mixture was kept at 0° C. for one hour with stirring, washed with cold ether, and adjusted to pH 2 with syrupy (85 percent) phosphoric acid. The resulting N-adamantyloxycarbonyl-D-phenylglycine was extracted into ethyl acetate and recovered by evaporation of the organic solvent. Yield: 2.7 g.; melting point, 114° C. A solution of 3.6 g. (11 millimoles) of the above protected amino acid in 60 ml. of dry tetrahydrofuran containing triethylamine, 1.1 g. (11 millimoles), was converted into 6.0 g. of 7-[N-(1-adamantyloxycarbonyl) - D - α - phenylglycylamido]cephalosporanic acid by the method of Example 4. The protecting group was removed with trifluoroacetic acid by a procedure similar in all respects to Example 4.

EXAMPLE 7

To a stirred solution of 32.7 g. (0.33 mole) of furfuryl alcohol, 7.9 g. (0.1 mole) of pyridine, and 2.5 ml. of acetone at 10° C. were added 20.2 g. (0.10 mole) of p-nitrophenylchloroformate [prepared by the method of G. W. Anderson and A. C. McGregor, J. Am. Chem. Soc., 79, 6180 (1957)]. After the addition, the stirred mixture was allowed to warm slowly to room temperature. It was observed that an exothermic reaction ensued, and accordingly an upper temperature limit of 30° C. was maintained by external cooling. After 3 hours, 300 ml. of water were added and the mixture was filtered.

The residue was slurried in 900 ml. of a 1:2 mixture of benzene and hexane and again filtered. The aqueous and organic filtrates were combined and washed with one liter of sodium carbonate solution, then with one liter of water, the aqueous washings being discarded. Distillation of the solvent from the organic layer in vacuo left a white solid residue which was recrystallized from methanol, yielding 12.0 g. (45 percent) of p-nitrophenyl furfuryl carbonate, melting point 92–93° C.

*Analsyis.*—Calcd. (percent): C, 54.75; H, 3.42; N, 5.32. Found (percent): C, 54.46; H, 3.40; N, 5.12.

A mixture of the above carbonate, 2.06 g. (7.5 millimoles); D-phenylglycine, 0.916 g. (6.0 millimoles); 6 ml. of 2 N sodium hydroxide, and 2 ml. of tetrahydrofuran was stirred at room temperature for 25 hours. The tetrahydrofuran was removed under reduced pressure and the precipitated solid was collected by filtration and washed with 100 ml. of 1 N sodium bicarbonate solution. The filtrate and washings were combined and adjusted to pH 5.90 with 10 percent hydrochloric acid solution and extracted with 100 ml. of ether. The aqueous phase was over-layered with an additional 100 ml. of ether and the pH adjusted to 2.0 with 10 percent hydrochloric acid. The ether layer was separated and the aqueous layer washed with a fresh portion of 100 ml. of ether. The ether extracts were dried and evaporated in vacuo, leaving 0.800 g. of a white solid. Successive recrystallizations from 4:1 benzene-petroleum ether (boiling range 60–90° C.) and from ethanol yielded 0.564 g. (34 percent) of N-furfuryloxycarbonyl-D-phenylglycine, 130–131° C.

*Analysis.*—Calcd. (percent): C, 61.09; H, 4.76; N, 5.09. Found (percent): C, 60.82; H, 4.79; N, 5.13.

N-furfuryloxycarbonyl-D-phenylglycine, 5.5 g. (20 millimoles) in tetrahydrofuran, 100 ml., was cooled to 0° C., and triethylamine, 2.80 ml., was added dropwise with stirring. The resulting solution was cooled to −10° C. and isobutyl chloroformate, 2.60 ml., was added. This mixture was stirred at −10° C. for 15 minutes, after which a solution, prepared by adding triethylamine, 2.80 ml., to 5.4 g. (20 millimoles) of 7-aminocephalosporanic acid in 100 ml. of aqueous 50 percent tetrahydrofuran, was added slowly. Stirring was continued for one hour at 0° C. and for one hour while the solution was allowed to warm to room temperature. The tetrahydrofuran was then removed under reduced pressure and the residue diluted with 100 ml. of water. The aqueous solution this obtained was washed with 100 ml. of ethyl acetate, over-layered with 200 ml. of ethyl acetate, and adjusted with 10 percent hydrochloric acid to pH 3.0. The ethyl acetate was separated and the aqueous layer extracted with an additional 100 ml. of ethyl acetate. The ethyl acetate layers were combined, washed with 100 ml. of water, and dried. Evaporation of the solvent gave a pale yellow solid, which was recrystallized from benzene-ethyl acetate to give 4.5 g. (42 percent) of 7-(N'-furfuryloxycarbonyl-D-α-phenylglycylamido-cephalosporanic acid.

The protecting group was removed by stirring 0.529 g. of the above product with 60 ml. of 75 percent formic acid at room temperature for 45 minutes. The solution was concentrated under reduced pressure and the residue triturated to crystallization with 50 ml. of ethyl acetate. Yield, 290 mg. of the desired 7-(D-α-aminophenylacetamido)cephalosporanic acid.

EXAMPLE 8

7-aminocephalosporanic acid, 10 g. (36.6 millimoles), was suspended in 650 ml. of water and commingled with 3.7 g. (36.6 millimoles) of triethylamine to effect solution. The resulting solution was acidified to pH 5 with syrupy (85 percent) phosphoric acid and to it was added with vigorous stirring at 0 to 2° C. N-carboxy-D-α-phenylglycine anhydride [prepared by the method of Dvonch, W.; Fletcher, H. and Alburn, H.; J. Org. Chem., 29, 2764 (1964)], 3.3 g. (18.5 millimoles), over a period of 15 minutes. The mixture was stirred and cooled an additional hour, warmed to room temperature, and filtered. The filtrate was acidified to pH 3.5 with syrupy phosphoric acid and filtered, and the filtrate was concentrated to dryness. The residue was redissolved in 150 ml. of water, and the solution was filtered and evaporated to dryness, yielding 1.2 g. of crystalline 7-(D-α-aminophenylacetamido)cephalosporanic acid.

EXAMPLE 9

A mixture of α-(1-naphthyl)glycine, 5 g., p-nitrophenyl tert.-butyl carbonate, 9.0 g., sodium carbonate, 6.5 g., and tert.-butyl alcohol, 37 ml., in 25 ml. of water, was heated for 30 minutes on a steam bath. An additional 100 ml. of water were added and the tert.-butyl alcohol phase was decanted. The aqueous mixture (sodium phenylate precipitating out) was over-layered with ethyl acetate, and concentrated hydrochloric acid was added to pH 2. The ethyl acetate solution was separated and then shaken with sodium bicarbonate solution. The aqueous bicarbonate solution was separated, acidified to pH 2, and extracted with ethyl acetate. The ethyl acetate layer was shaken with water, then with saturated sodium chloride solution, then dried and concentrated. The residue was crystallized from ethyl acetate-petroleum ether (boiling range 60–90° C.). Recrystallization from 2:1 benzene-ethyl acetate gave 2.9 g. of α-(tert.-butyloxyformamido)-α-(1-naphthyl)acetic acid; melting point 168–171° C., dec.

*Analysis.*—Calcd. (percent): C, 67.75; H, 6.35; N, 4.65. Found (percent): C, 67.47; H, 6.58; N, 4.36.

The tert.-butyloxyformamidonaphthylacetic acid was converted to 7-[tert.-butyloxycarbonyl-α-(1-naphthyl)glycylamido]cephalosporanic acid by the method of Example 4. The product was recrystallized from ether-petroleum ether (boiling range 60–90° C.); yield, 1.05 g.

The protecting group was removed with 75 percent formic acid by a method essentially similar in all respects to that of Example 7, yielding 650 mg. of 7-[α-amino - (1 - naphthyl)acetamido] - cephalosporanic acid,

EXAMPLE 10

D-α-phenylglycine, 10.419 kg., was slurried in 45 liters of benzene. An aqueous 50 percent sodium hydroxide solution prepared from 2760 g. of sodium hydroxide (minimum assay 90 percent) and 2760 g. of water was added and thoroughly mixed with the benzene slurry. The mixture was heated with stirring to 50–60° C. for one to two hours. Methyl acetoacetate, 8.0 kg., was added (using 3.8 liters of benzene wash) to the hot mixture. The mixture was distilled until free of water, and the resulting benzene slurry of the solid product was cooled to 25° C. and filtered. The solid was washed with benzene and heated to 60° C. for 4 hours. Yield: 16 kg. (85 percent of theory) of methyl 3-(α-carboxybenzylamino)crotonate as the sodium salt.

A solution containing 150 g.. of the above sodium salt was prepared using 1680 ml. of acetonitrile and 1.2 ml. of dimethylbenzylamine. This solution was cooled to −10° C., and 72 g. of ethyl chlorocarbonate were added in one portion. Stirring was continued for 20 minutes at −10° C. A solution of 151 g. of 7-aminocephalosporanic acid and 81.6 g. triethylamine in 720 g. of water was added in one portion, and the mixture stirred for one hour at 0° C. The resulting mixture was filtered and the filtrate evaporated in vacuo to a volume of about 960 ml. To this concentrate were added 1800 ml. of methyl isobutyl ketone and 240 ml. of formic acid (98–100 percent). The resulting mixture was allowed to stir at about 0° C. until crystallization was complete. The product 7 - (D-α-aminophenylacetamido)cephalosporanic acid was removed by filtration and washed by slurrying successively with 300 ml. of 3:2 methyl isobutyl ketone-water, twice with 150 ml. of water and twice with 150 ml. of methyl isobutyl ketone. Yield: 50–57 g. (22–25 percent).

EXAMPLE 11 dl - α - 2-thienylglycine was protected with the tert.-butyloxycarbonyl amine protecting group by the method of R. Schwyzer et al. Hev. Chim. Acta, 32, 2622 (1959) as follows: 18.1 g. (0.12 mole) of dl-α-(2-thienyl)glycine and 9.65 g. (0.24 mole) of magnesium oxide were ground together, suspended in 400 ml. of a 1:1 mixture of dioxane and water, and stirred for one hour at room temperature. Tert.-butylazidoformate, 34.4 g. [prepared by the method of Carpino, L. A., Giza, C. A., and Carpino, B. A.; J. Am. Chem. Soc. 81, 955 (1959)] in 200 ml. of dioxane, was added and the reaction mixture stirred at 40° C. for 24 hours. The mixture was diluted with 1600 ml. of water and extracted with 3 x 150 ml. of ethyl acetate. The aqueous layer was cooled in an ice bath to 0° C. and adjusted to pH 2.5 with 1 N hydrochloric acid. The cloudy solution was extracted with 3 x 300 ml. of ethyl acetate; and the combined ethyl acetate extracts were washed with water, dried, and evaporated in vacuo at a temperature below 40° C. The resulting N-tert.-butyloxycarbonyl - dl - α - (2 - thienyl)glycine was converted to 7 - [α - amino - α - (2 - thienyl)acetamido]cephalosporanic acid by the method of Example 2.

EXAMPLE 12

A suspension of 750 mg. of 7 - (α - amino - α - phenylacetamido) - cephalosporanic acid in 100 ml. of water was adjusted to pH 7.1 with 0.2 N sodium hydroxide and treated with an excess of orange peel extract at pH 7.0. The pH was kept constant at 7.0 during the reaction by titration with 0.2 N NaOH.

After 4 hours the pH had become constant, and the resulting solution was treated with 21 g. of activated carbon, and filtered through a pad of diatomaceous earth.

The pad was extracted with 500 ml. of an aqueous 80 percent acetone solution and the extract was evaporated in vacuo to remove the acetone. The resulting aqueous solution was lyophilized to yield 195.2 mg. of 3-hydroxymethyl - 7 - (α - amino - α - phenylacetamido)-3-cephem-4-carboxylic acid.

EXAMPLES 13, 14, 15, AND 16

Additional compounds of this invention were prepared by the above described methods as shown below using the appropriately substituted starting materials.

7 - (d - α - amino - 4-chlorophenylacetamido)cephalosporanic acid by method of Example 9.

7 - (l - α - amino - 4 - chlorophenylacetamido) cephalosporanic acid by method of Example 9.

7 - (dl - α - amino - 2 - furlyacetamido)cephalosporanic acid by method of Example 11.

7 - (dl - α - methylaminophenylacetamido)cephalosporanic acid by method of Example 9.

The compounds of the present invention are highly effective against penicillin-resistant *Staphylococcus aureus*, and many of the compounds are, surprisingly, more effective in the presence of blood serum than its absence. The following table lists the minimum inhibitory concentration (MIC) ranges of the compounds of the operating examples, both in the presence and in the absence of human blood serum, against four clinical isolates of penicillin-resistant *S. aureus*, as measured by the gradient-plate technique:

| Compound name | Activity, MIC, μg./ml. | |
|---|---|---|
| | Without serum | With serum |
| 7-(dl-α-methylamino-α-phenylacetamido) cephalosporanic acid | 3.2–6 | 1.2–2 |
| 7-(D-α-amino-α-phenylacetamido)cephalosporanic acid | 1–3.4 | 1.1–10 |
| 7-[d-α-amino-α-(p-chlorophenyl)-acetamido]-cephalosporanic acid | 47–132 | 31–132 |
| 7-[l-α-amino-α-(p-chlorophenyl)-acetamido]-cephalosporanic acid | 1.5–5 | 1.5–10 |
| 7-[dl-α-amino-α-(2-furyl)acetamido]cephalosporanic acid | 22–36 | 37–47 |

While the compounds of the present invention have been defined in terms of a structural formula which depicts the novel structural features of the claimed compounds and which indicates the presence therein of certain well-known organic radicals, including phenyl, thienyl, benzothienyl, furyl, benzofuryl, pyridyl, and indolyl, it will be recognized by those skilled in the art that such radicals may bear one or more substituents without departing in any way from the spirit of the invention and without altering the properties of the novel compounds in such a way as would set them apart from the invention or take them outside its scope. Compounds having the novel structure of the present invention and bearing such substituents are accordingly to be considered as equivalents of the unsubstituted compounds and are to be considered to lie within the scope of the invention. Among such substituent atoms and radicals are fluoro, chloro, bromo, iodo, hydroxy, nitro, lower alkyl, (i.e., methyl, ethyl, n-propyl, isopropyl, n-butyl, isobutyl, sec.-butyl, or tert.-butyl), trifluoromethyl, methoxy, methylmercapto, cyano, amino, aminomethyl, hydroxymethyl, β-hydroxyethyl, acetyl, acetamido, and the like. Thus, the pyridino moiety of $R^1$ may be groups produced by reaction of cephalosporin C with pyridine, nicotine, nicotinic acid, isonicotinic acid, nicotinamide, 2-aminopyridine, 2-amino-6-methylpyridine, 2,4,6-trimethylpyridine, 2-hydroxymethylpyridine, sulfapyridine, 3-hydroxypyridine, pyridine - 2,3 - dicarboxylic acid, quinoline, sulfadiazine, sulfathiazole, picolinic acid, and the like.

I claim:

1. An antibiotic substance of the class represented by the following formula:

$$\begin{array}{c} R^5-NH \quad O \quad\quad\quad S \\ | \quad\quad\quad || \quad\quad\quad\quad\quad \\ R^3-C-\!\!\!-C-NH-CH-CH \quad CH_2 \\ | \quad\quad\quad\quad\quad\quad\quad | \quad\quad | \\ R^4 \quad\quad O=C-\!\!\!-N \quad C-CH_2-R^1 \\ \quad\quad\quad\quad\quad\quad\quad\quad \backslash C \!\!\!/ \\ \quad\quad\quad\quad\quad\quad\quad\quad | \\ \quad\quad\quad\quad\quad\quad\quad\quad C-R^2 \\ \quad\quad\quad\quad\quad\quad\quad\quad || \\ \quad\quad\quad\quad\quad\quad\quad\quad O \end{array}$$

wherein:

$R^1$ is acetoxy, hydroxy, or pyridino;
$R^2$ is —OH when $R^1$ is hydroxy or acetoxy;
$R^2$ is —O⁻ when $R^1$ is pyridino;
$R^3$ is phenyl, naphthyl, thienyl, benzothienyl, furyl, benzofuryl, indolyl, or pyridyl;
$R^4$ is hydrogen or methyl; and
$R^5$ is hydrogen or methyl;

and the salts thereof with pharmaceutically acceptable cations and anions,

2. A compound as in claim 1, said compound being 7-(α-amino-α-phenylacetamido) cephalosporanic acid.

3. A compound as in claim 1, said compound being 7-(dl-α-amino-α-phenylacetamido)cephalosporanic acid.

4. A compound as in claim 1, said compound being 7-(L-α-amino-α-phenylacetamido)cephalosporanic acid.

5. A compound as in claim 1, said compound being 7-(D-α-amino-α-phenylacetamido)cephalosporanic acid.

6. A compound as in claim 1, said compound being 7-[α-amino-α-(2-thienyl)acetamido]cephalosporanic acid.

7. A compound of the formula $$\begin{array}{c} \quad\quad\quad\quad\quad\quad O \quad\quad\quad\quad\quad S \\ \quad\quad\quad\quad\quad\quad || \quad\quad\quad\quad\quad\quad \\ \text{[thienyl]}-CH-C-NH-CH-CH \quad CH_2 \\ \quad\quad\quad\quad | \quad\quad\quad\quad\quad | \quad\quad | \\ \quad\quad\quad\quad NH_2 \quad\quad O=C-\!\!\!-N \quad C-CH_2A \\ \quad\quad\quad\quad\quad\quad\quad\quad\quad\quad\quad\quad\quad \backslash C \!\!\!/ \\ \quad\quad\quad\quad\quad\quad\quad\quad\quad\quad\quad\quad\quad | \\ \quad\quad\quad\quad\quad\quad\quad\quad\quad\quad\quad\quad COOM \end{array}$$

wherein A is hydroxyl, (lower)alkanoyloxy, or a quaternary ammonium radical; and M is hydrogen, a pharmaceutically acceptable non-toxic cation, or an anionic charge when A is a quaternary ammonium radical.

8. A compound of claim 7 having the formula

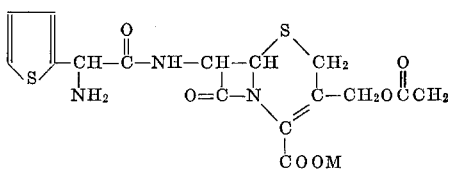

wherein M is a non-toxic, pharmaceutically acceptable cation.

9. A compound of claim 7 having the formula

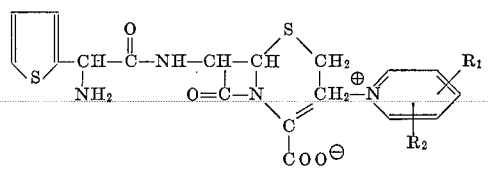

wherein $R_1$ and $R_2$ are each hydrogen or methyl.

10. The compound of claim 9 wherein $R^1$ and $R^2$ are each hydrogen.

11. A compound of the formula

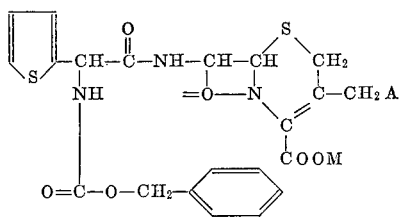

wherein A is hydroxyl, (lower)alkanoyloxy, or a quaternary ammonium radical; and M is hydrogen, a pharmaceutically acceptable nontoxic cation, or an anionic charge when A is a quaternary ammonium radical.

12. A compound of claim 11 having the formula

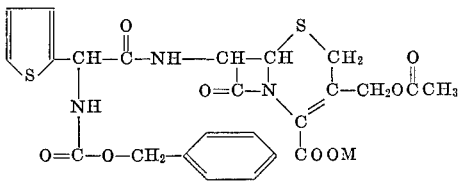

where M is a non-toxic, pharmaceutically acceptable cation.

13. A compound as in claim 1, said compound being 3-hydroxymethyl - 7 - ($\alpha$ - amino - $\alpha$ - phenylacetamido)-3-cephem-4-carboxylic acid.

14. 7 - (2 - amino - 2 - (3 - indolyl)acetamido) cephalosporanic acid.

15. 7 - (2 - amino - (2 - furyl)acetamido) cephalosporanic acid.

References Cited
UNITED STATES PATENTS 3,173,916   3/1965   Shull et al. _____ 260—293

NICHOLAS S. RIZZO, Primary Examiner

U.S. Cl. X.R.

424—246

UNITED STATES PATENT OFFICE
CERTIFICATE OF CORRECTION

Patent No. 3,560,489        Dated February 2, 1971

Inventor(s) Robert B. Morin

It is certified that error appears in the above-identified patent and that said Letters Patent are hereby corrected as shown below:

Column 2, line 9, "alosporin $C_A$," should read -- alospo C and as cephalosporin $C_A$, --; lines 11 to 17, the second formula should appear as shown below:

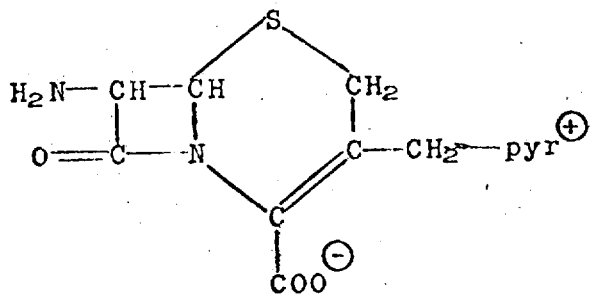

line 22, "cephem" should read -- cepham --. Column 3, lines 10, "3-(2'-hydroxymethylpyridylmethyl)-7-(α-amino-α-phenylpr amido-3-cephem-4-carboxylic acid" should read -- 3-(2'-Amino methylpyridinomethyl)-7-(α-amino-α-phenylacetamido)-3-cephem 4-carboxylic acid --. Column 11, line 3, ", Hev. Chim. Acta, should read -- Helv. Chim. Acta, 42, --. Column 13, claim 8, in the structural formula,

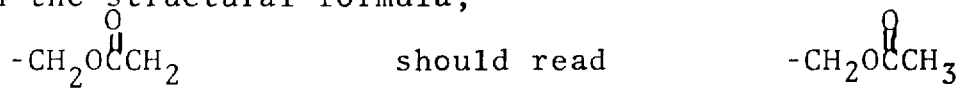

Claim 9, lines 12 to 19, the formula should appear as shown

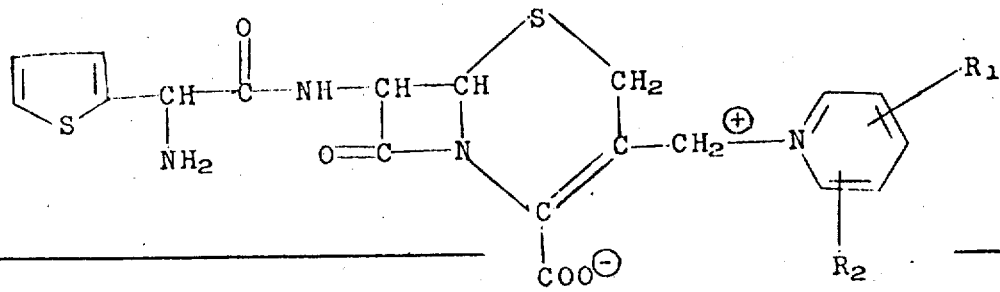

UNITED STATES PATENT OFFICE
CERTIFICATE OF CORRECTION

Patent No. 3,560,489     Dated February 2, 1971

Inventor(s) Robert B. Morin     PAGE - 2

It is certified that error appears in the above-identified patent and that said Letters Patent are hereby corrected as shown below:

Claim 11, lines 24 to 31, the formula should appear as shown below:

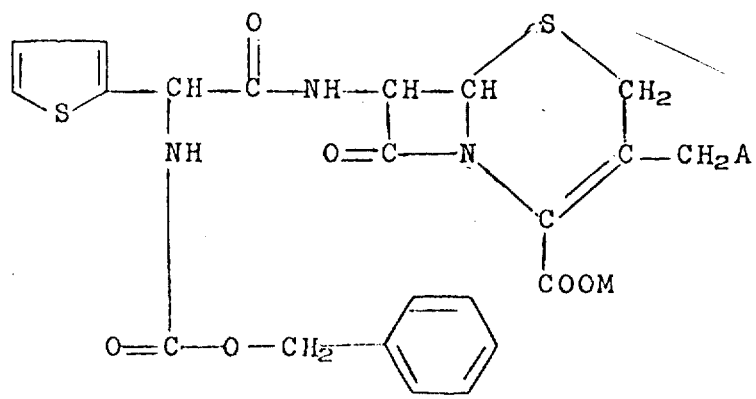

Signed and sealed this 16th day of May 1972.

(SEAL)
Attest:

EDWARD M. FLETCHER, JR.
Attesting Officer

ROBERT GOTTSCHALK
Commissioner of Paten